Nov. 8, 1938. E. A. ROCKWELL Re. 20,910

FLUID PRESSURE BRAKE

Original Filed Dec. 9, 1927 4 Sheets-Sheet 1

INVENTOR
EDWARD A. ROCKWELL
BY Arthur Wright
ATTORNEY

Nov. 8, 1938. E. A. ROCKWELL Re. 20,910
FLUID PRESSURE BRAKE
Original Filed Dec. 9, 1927 4 Sheets-Sheet 2
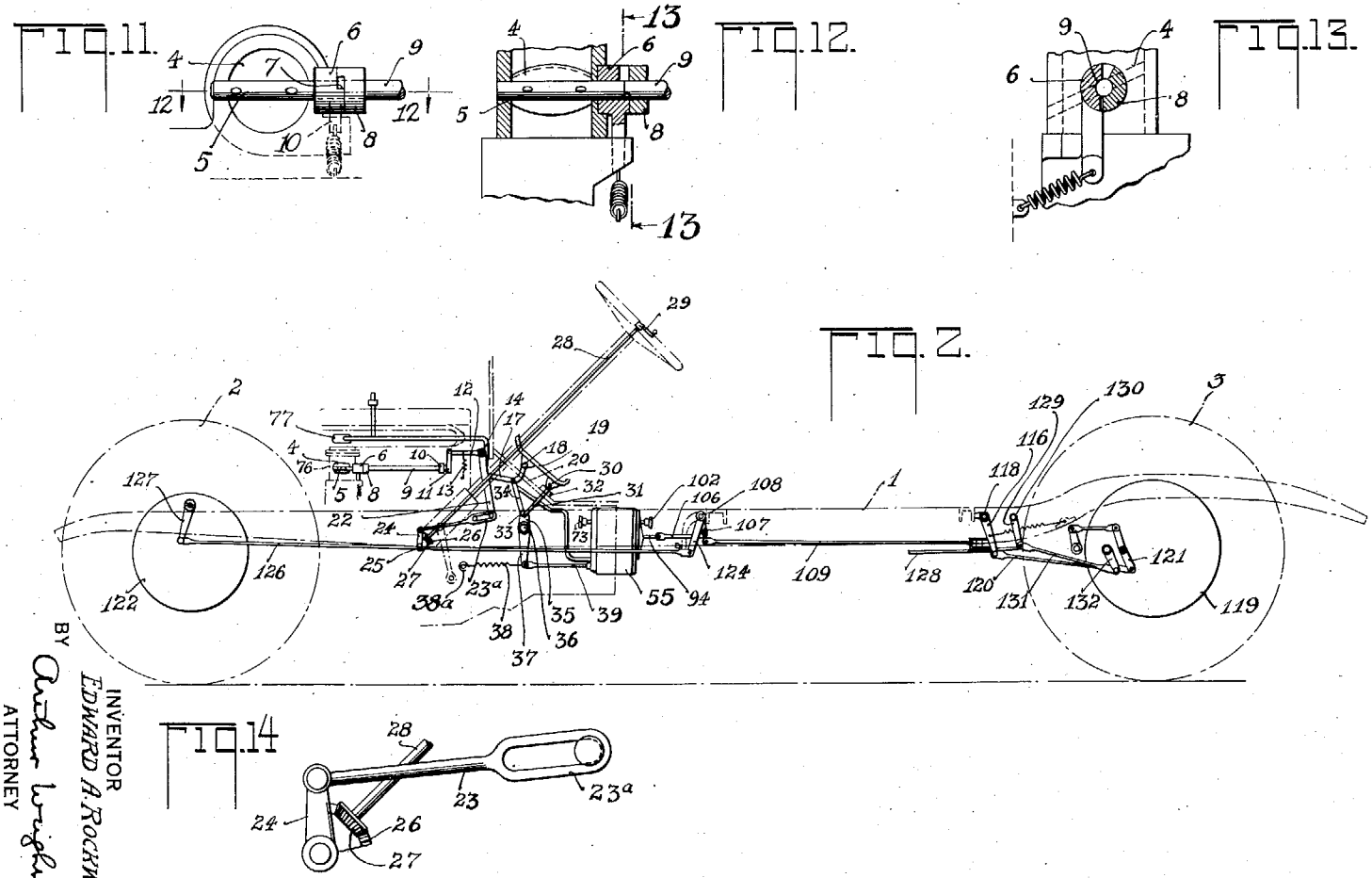
INVENTOR
EDWARD A. ROCKWELL
BY Arthur Wright
ATTORNEY Nov. 8, 1938. E. A. ROCKWELL Re. 20,910
FLUID PRESSURE BRAKE
Original Filed Dec. 9, 1927 4 Sheets-Sheet 3
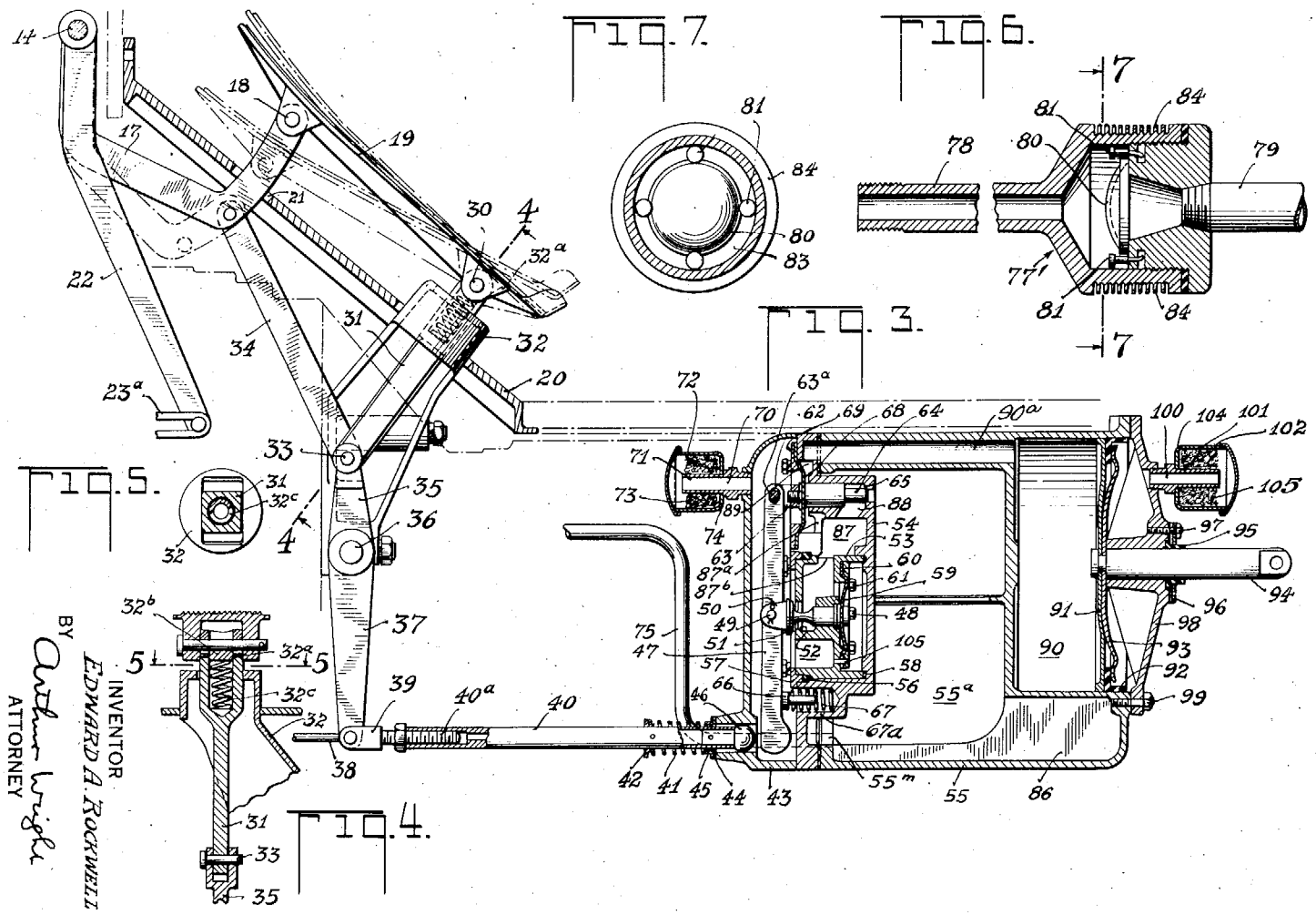
INVENTOR
EDWARD A. ROCKWELL
BY Arthur Wright
ATTORNEY Nov. 8, 1938. E. A. ROCKWELL Re. 20,910

FLUID PRESSURE BRAKE

Original Filed Dec. 9, 1927 4 Sheets-Sheet 4

INVENTOR
EDWARD A. ROCKWELL
BY Arthur Wright
ATTORNEY

Reissued Nov. 8, 1938

Re. 20,910

UNITED STATES PATENT OFFICE 20,910

FLUID PRESSURE BRAKE

Edward A. Rockwell, Chicago, Ill., assignor, by mesne assignments, to General Auto Parts Corporation, a corporation of Delaware Original No. 1,896,374, dated February 7, 1933, Serial No. 238,828, December 9, 1927. Application of reissue June 1, 1934, Serial No. 728,561

36 Claims. (Cl. 188—152)

My invention relates particularly to mechanism adapted to control the application of power, and has especial application for use in connection with brakes such, for example, as automobile brakes.

The object of my invention is to provide a power controlling mechanism in which the control of the power is accomplished by controlling the pressure applied, both on the pressure-applying and pressure-releasing movements. The construction is such, furthermore, that in the release of the pressure-control the pressure will be shut off at any particular pressure up to a certain maximum pressure. This construction, furthermore, provides an instantaneous release especially due to the large passages admitting the pressures. Furthermore, the preferred construction utilizes the vacuum of the engine; but any source of vacuum can be utilized. This pressure control system is applicable to any variation from the atmospheric pressure generally; but it is especially useful with sub-atmospheric pressure or vacuum, and particularly when the sub-atmospheric pressure is derived from the intake manifold of the engine; for the reason that a vacuum reserve is obtained and maintained sufficient for quick and maximum operation of the brakes by communication with the source of vacuum so limited that the engine operation is not impaired by deriving the vacuum from that source, as will be liable to happen if in each instance in applying the brake the necessary vacuum were derived directly from the intake manifold. With the construction shown the operation is that a reserve vacuum is built up and maintained by the continuously open communication of the reserve chamber with the intake manifold which builds up the vacuum in the reserve chamber between the intervals of braking.

Further objects of my invention will appear from the detailed description of the same hereinafter.

While my invention is capable of embodiment in many different forms, for the purpose of illustration I have shown only one form of the same in the accompanying drawings, in which,—

Fig. 2 is a side elevation of the same (the engine being shown in phantom);

Fig. 3 is a vertical section through a portion of the same;

Fig. 4 is a detail shown in section taken on line 4—4 of Fig. 3;

Fig. 5 is a section taken on line 5—5 of Fig. 4;

Fig. 6 is a sectional view of a trap valve used in connection with my invention;

Fig. 7 is a detail section on line 7—7 of Fig. 6;

Fig. 11 is a detail on a larger scale of certain parts shown on Fig. 1;

Fig. 12 is a section at the line 12—12 on Fig. 11;

Fig. 13 is a section at the line 13—13 on Fig. 12; and

Fig. 14 is a detail elevation on a larger scale of certain parts shown on Fig. 2.

Figure 1:
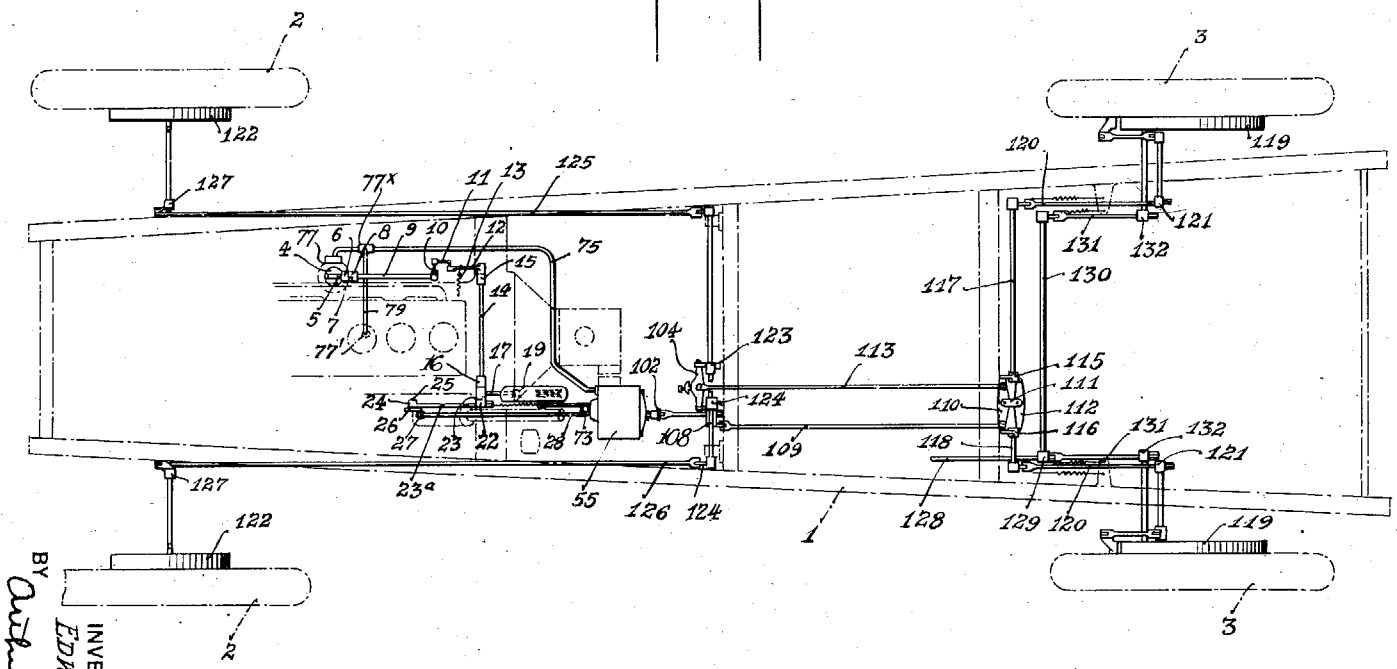
Fig. 1 is a plan view of an automobile chassis which is equipped with my invention.

In the drawings I have shown a chassis of an automobile having front wheels 2, and rear wheels 3. On the chassis 1 I have provided an internal combustion engine of any desired type, having all the usual elements, including a carbureter, as well as a throttle valve 4, for controlling the carbureter. The throttle valve 4 is mounted on a shaft 5 which carries a sleeve 6 having at one end a stop shoulder 7 for cooperating with a complementary sleeve 8 having a like stop shoulder, said sleeve 8 being carried by a shaft 9, aligned with the shaft 5, and the sleeves having their respective stop shoulders relatively positioned to permit a certain amount of relative rotation of the two aligned shafts in bringing the shoulders into engagement. The shaft 9 is operated by an arm 10 connected by a link 11 to a lever arm 12 normally held downwardly by a spring 13 secured at one end to the engine body. The arm 12 is tight on a shaft 14 carried by journal bearings 15 and 16, also mounted on the engine. At the other end of the shaft 14 there is an arm 17 which is approximately U-shaped, and the other end of which is connected by a pivot 18 to a foot pedal 19 supported above a floor board 20 of the automobile. The upper end of the lever 17 passes through an opening 21 in the floor board, which is kept closed in any desired manner around the lever 17. In order that the throttle valve 4 may be operated not only by the foot pedal, but also from the steering column, there is provided a lever 22 on the end of the shaft 14, which is fixed to the shaft 14 adjacent the connection of the lever 17 and is connected to the link 23 which is provided with an elongated slot 23a to receive the lower end of the lever 22. It will, therefore, be apparent that the lever 22 may be moved without movement of the link 23 but movement of the link 23 will positively move the lever 22 to operate the throttle. The link 23 is connected to a lever 24 on a shaft 25 provided with a bevel gear 26 meshing with a bevel gear 27 on a shaft 28 having the usual hand lever 29 for moving the carbureter throttle.

The other end of the pedal 19 has near the heel of the same a pivot 30 connected to a link 31, which passes through a housing 32 extending through the floor board 20. An amount of play between the pedal 19 and the link 31 is provided by means of a slot 32a in the link 31, through which the pivot 30 passes, so that the latter rests upon a plug 32b, pressed upwardly by a spring 32c. The other end of said link 31 is connected to a pivot 33 on a link 34, which is also pivoted to the U-shaped lever 17. The said pivot 33 also making pivotal connection of both links 31 and 34, with the end of a short lever 35, on a shaft 36, from the other side of which there is extended a longer lever 37, both said levers being tight on said shaft.

To the lower end of the lever 37 there is attached one end of a stretched spring 38 whose other end is attached to the engine body, as seen at 38a, so that the spring reacts to restore the foot pedal 19; and at the other side of said lever 37 it is connected by link 39 and adjustable connection 40a to a plunger 40, which operates valve mechanism hereinafter described contained in a casing 55 controlling the access of sub-atmospheric pressure derived from any suitable source, as the intake manifold of the engine as hereinafter described, to a cylinder and piston comprised and contained in said casing 55, as hereinafter described. The stem of the piston protruding from the casing, as seen at 94, is connected by a link 106 to a lever 107, which is carried by a shaft 108 journaled on the chassis of the car. The end of the lever 107 is provided with a brake-operating rod 109 connected at its rear end to a link 110 for equalizing the front and rear brakes, the middle of said link being supported by a link 111 from the middle of the link 112, which equalizes the rear brakes.

The other end of the link 110 is connected by a rod 113 to a link 104 for equalizing the front brakes. It will be noted that the link 112 is connected at its two ends to levers 115 and 116 on shafts 117 and 118, respectively, which are adapted to operate the brakes on drums 119 on the rear wheels by any suitable linkage indicated at 120 and 121. Similarly, the link 104 is arranged to operate the front brakes 122 through the aid of levers 123 and 124, links 125 and 126, and levers 127. At the same time, it will be understood that the usual emergency hand brake may be provided which is adapted to operate a separate set of brakes by means of a link 128 leading to levers 129 on a shaft 130 which is provided with links 131 and levers 132 for operating a band brake device on the interior of the drums 119 in case the other brakes are located on the outside of said drums.

The valve mechanism for controlling the sub-atmospheric pressure access to the piston cylinder for operating the vacuum brake connections will now be described.

The plunger 40 is made adjustable in length by comprising two parts screwed together, as seen at 40a. A spring 41, is provided reacting against a stop 42 on the plunger 40 and at its other end against the face of a cover plate 43. A leather washer 44 is located around the plunger 40 and held in place by a retainer 45 for rendering air-tight the joint between the cover and the plunger. The plunger is terminated at the inner end with a ball 46 for accommodating the slight angular changes in position of the lower end of the lever 47, located within the cover 43, with which lever the plunger is to cooperate as will be explained. At its central portion the lever 47 is connected by a pivot 49 to a valve rod 50 having a stop washer 48 thereon, and provided with a valve 51 cooperating with a valve seat 52 in an inner valve casing 53, which is in turn carried in a casing 54, which is mounted as a closure for and protruding into a vacuum chamber 55a, formed in the casing 55, in which there is also formed a piston cylinder 90 which intrudes into the chamber 55a, at the rear, and is in communication by a passage 90a, formed in the side wall of the chamber 55a with a chamber 87, hereinafter mentioned. In the cylinder 90 there is provided a piston 91 whose stem 94, above mentioned, for operating wheel brakes, as described, extends out through a cover member 98 clamped to the casing 55 by screws 99. The piston 91 is provided with a suitable cup-leather 92 held in place by a disk spring 93 and the stem 94 is provided with a leather packing 95 held in place on the cover by washer 96 and screws 97. The rear face of the piston is at all times exposed to atmospheric pressure through a port 100, carrying a tube 101, in a housing 102, forming a chamber 103, having air vents 104 and containing air filtering material 105. A packing ring 56 makes a tight joint between the valve casing 53 and 54 and a retainer ring 57 holds the packing ring 56 in place. For the same purpose, a further packing ring 58, is located at the inner end of the casing 53 between the same and the wall of the casing 54. At its inner end the valve rod 50 is connected to a diaphragm 59 which is held in place by a ring 60 and screws 61. At its upper end the lever 47 has a slot 62 forming a pivotal connection 63a with an upper valve stem 63 and carrying at the other end a valve 64 cooperating with a valve seat 65 in the outer valve casing 54 and controlling communication of the chamber 87 with the sub-atmospheric pressure chamber 55a. It will be noted that the valve 51 has a larger area than the valve 64, so that the action of equal vacuum upon the two valves will not be balanced; and in addition there is a tendency for the valve 51 to be unseated due to the plunger 66 which is carried within a compressed spring 67, housed in a pocket 67a, provided for it in the outer valve casing 54, said plunger 66 being arranged so as to press against the lower end of the lever 47. The purpose of this feature of the construction will hereinafter appear.

The forward end of said valve stem 63 is connected to a diaphragm 68 held in place by a clamping ring 69 on the outer valve casing 54. The forward face of this diaphragm 68 is always exposed to atmospheric pressure through a port 70, from which a tube 71 leads to a housing 72, forming an air filtering chamber 73 having atmosphere vent shown at 74 and containing filtering material.

The chamber 87 is in communication between the interiors of the valve casings 53 and 54 through the port 87b and with the valve seat 65 which is controlled by the valve 64 through the port 88. Finally the pressure in chamber 87 is communicated to the passage 90a through the ports 87a and 89. Thus the vacuum depression which acts against the piston produces a differential in pressure between the atmosphere and the vacuum depression which produces the movement of the piston, and is subjected to the interior of the chamber 87 against the inner surfaces of the diaphragms which are attached to the valves. Each of the diaphragms is exposed on the exterior to atmospheric pressure. Since the diaphragms are of larger area than their corresponding valves, a differential pressure is produced which acts on each valve to move it to its normal position. Therefore, the valve 64, as the vacuum depression is admitted, tends to move to closed position while the valve 51 tends to move to open position. The pressure moving the valves to operative position must therefore increase as the differential operative pressure is built up and it is for this reason that the operator may variably control the brake pressure by his foot upon the pedal.

Figure 8:
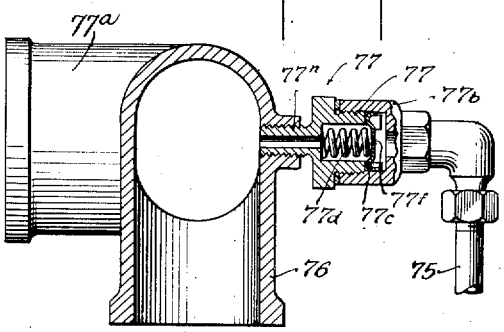
Fig. 8 is a section showing the check valve controlled connection from a source of vacuum in the intake manifold.

A condition of sub-atmospheric pressure or vacuum is produced in the chamber of the casing 55 by connection with the intake manifold of the engine, as by the pipe 75, leading from connection with the manifold, see at fitting 77, in Fig. 2, to the vacuum reservoir in the casing 55, as shown at 55*m*, on Fig. 3. For properly controlling the communication of vacuum, the valves shown in detail in Figs. 8 and 9 may be employed. The valve construction shown in Fig. 8 comprises the fitting 77, connected to the intake manifold at 77'', said fitting having a chamber formed between two screwed-together parts 77*a* and 77*b*, and including therein a disc valve 77*c*, bowed for stiffness to resist the excess of atmospheric pressure over the sub-atmospheric pressure of the intake manifold and seating at the end of the fitting member 77*a*, but with an interposed spring 77*d* tending to hold said valve off said seat. This disc valve has a very small port 77*f* for permitting restricted air flow even when the valve is seated, the spring being of suitable stiffness to hold the valve off its seat and permit free flow of air around it into the manifold when the suction is low, as when the engine is running with wide open throttle, but to permit it to be seated by the suction when the suction is high, as when the engine is idling with the throttle valve nearly closed, under which latter condition the access of air inflow is restricted to the flow capacity of the port 77*f*; and the vacuum transmitted to the vacuum chamber in the casing 55 is restricted accordingly.

Figure 9:
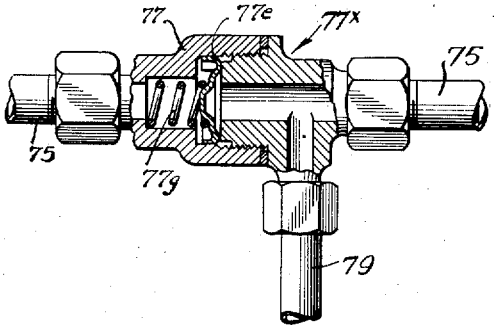
Fig. 9 is a section showing a second check valve controlled connection used therewith.
Figure 10:
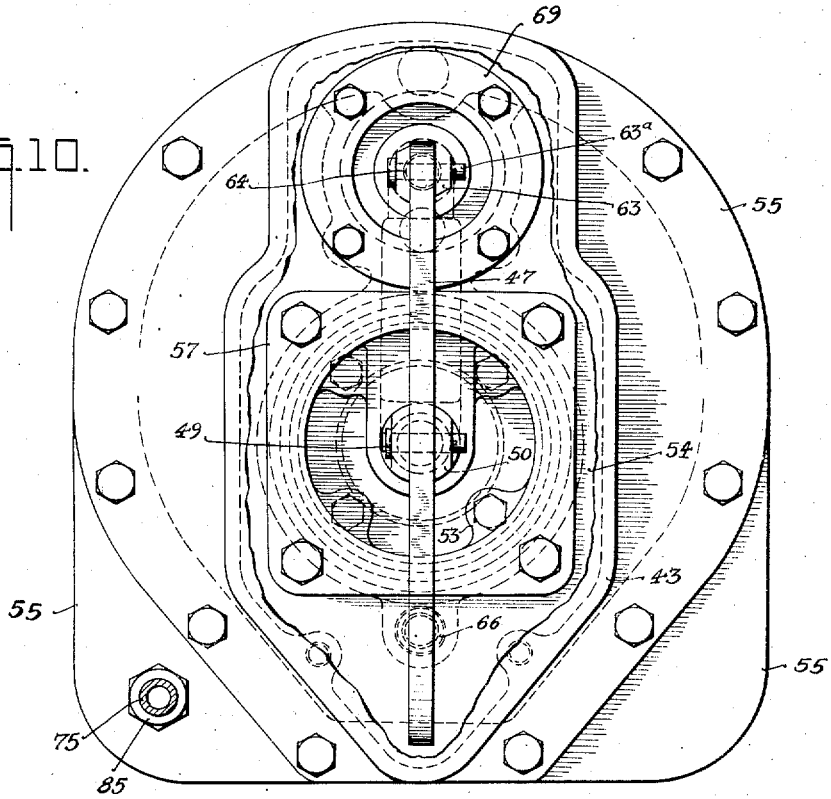
Fig. 10 is an elevation of the vacuum chamber with the front cover partly broken away.

In the pipe 75, between the fitting 77 and the connection of said pipe 75, to the casing 55, there is interposed a check valve fitting 77*x*, seen in detail in Fig. 9, from which it may be understood without further specific description that said check valve 77*e*, in said fitting, is adapted to be held seated by the spring 77*g*, except when opened by atmospheric pressure in opposition to the sub-atmospheric pressure of the intake manifold, this valve thus serving to retain beyond it, that is, on the side away from the intake manifold, whatever degree of vacuum may have been produced by the flow inward past it at any state of high vacuum in the intake manifold. The construction comprising the cooperating check valve-controlled connections 77 and 77*x* shown in Figs. 8 and 9, may be desirably used together with a pipe connection 79 from pipe line 75 to an engine cylinder at 77' and including therein a check valve device, as shown in Figs. 6 and 7, or the pipe connections 75 and 79 together with the check valve device, as shown in Figs. 6 and 7, may be used entirely independent of the connection to the intake manifold.

In Fig. 6 there is shown a valve device which may, if desired, be employed for building up the vacuum by forming the connection between the pipe 79 and the engine cylinder. This device is sometimes called a "vacuum trapping valve", and consists of a fitting 77', provided with a duct 78 adapted to be connected to the engine cylinder and a pipe connection 79 which extends to the pipe line 75 on the reservoir side of the check valve 77*e*. The fitting 77' includes therein a disk valve 80 bowed for stiffness and seated at its concave side away from the source of suction, which may be a selected cylinder of the engine, said valve being retained with short range of movement toward and from its seat 83 by any suitable means, as the headed pins 81, hooked at their inner end for engaging the seat of the valve, the range of movement of the valve being from its seat the heads of the pins. The mode of action of this device for the purpose stated is that at the peak of suction in the cylinder to which the connection is made, the valve is opened and suction is communicated past it, producing vacuum on the side toward the vacuum reservoir; but the valve is immediately seated as the suction in the cylinder passes the peak and declines toward atmospheric pressure, and the valve is held seated thereafter during the pressure stroke of the piston, to be again opened upon the next suction stroke, each suction stroke tending to build up the vacuum beyond the valve, so that the vacuum may eventually, by this means, approximate the degree of vacuum in the cylinder at the suction peak. Since this device would be exposed to the hot engine gases in the pressure stroke of the piston, it is constructed with heat-radiating fins 84 for cooling.

In the operation of the combined pedal 19 it will be apparent that a depression of the toe to the dotted line position of Fig. 3, will move the link 17 and rotate the cross shaft 14, thus opening the throttle and speeding up the engine. With such opening of the throttle, the manifold suction is decreased. Depression of both heel and toe simultaneously is prevented by the linkage connections, including the link 34. As the heel is depressed to apply the brakes the toe lifts slightly to the upper dotted position. Thus the throttle is closed and manifold suction at a maximum at the time at which the brakes are applied.

Therefore the means employed for building up the high vacuum in the reservoir for operating the brakes includes the communication to the intake manifold which is provided with a spring-pressed check valve 77*e* which serves to trap the high vacuum on the reservoir side and will not open to pass air into the intake manifold except during periods of high suction in the manifold or low vacuum in the reservoir. The communication to the intake manifold includes adjacent the intake manifold a normally opened check valve 77 which is seated by the high suction in the intake manifold but is provided with a restricted opening therethrough to permit the exhaustion of air from the reservoir even when the valve is seated. This valve prevents passing a large amount of air into the intake manifold. It will be apparent that during conditions of atmospheric pressure in the intake manifold there will be no exhaustion of air from the reservoir and it is for this reason that I have employed an additional connection from the reservoir to one of the engine cylinders provided with a check valve for trapping the vacuum on the reservoir side.

The operation of the valve mechanism and fluid pressure connections as above described is as follows:

The chamber 55a being continuously in communication for deriving sub-atmospheric pressure from the engine intake,—whether the intake manifold or one cylinder of the engine,—through the pipe 75, upon depression of the heel of the pedal by the operator, the connection described causes the plunger 40 to actuate the lever 47 at its lower end. At this stage the valve 64 is held seated by atmospheric pressure on the diaphragm 68 as against sub-atmospheric pressure on the inner end of the valve 64; and the valve 51 is at open position, being held in that position by the lever 47, in the position seen in Fig. 3, by reason of its upper end engagement with the stem 63 of the diaphragm 68, and its lower end pressed to the left by the reaction of the spring 67 on the pin 66 against whose head the lever 47 rests, the valve 51 at this stage being balanced as to pressure on the diaphragm 59, which is exposed on both sides to atmospheric pressure. The inthrust of the plunger 40 first seats the valve 51 at its seat 52, whereupon the pivot 49 becomes the fulcrum, and further inthrust of the plunger 40, rocking the lever over that new fulcrum causes it to withdraw the valve 64 from its seat admitting sub-atmospheric pressure to the chamber 87 and thence by the port 87a past the diaphragm 38 and through the port 89 and passage 90a to the cylinder 90, wherein it operates for instroke of the piston by excess of atmospheric pressure over the sub-atmospheric pressure thus admitted.

Now it will be understood that the sub-atmospheric condition in the chamber 55a will be reproduced in the chamber 87 upon opening the valve 64 and maintaining it open any substantial length of time to permit the gas to pass the port 65 for equalizing the pressure at opposite sides of that port; and since one purpose of the present invention is to cause the braking pressure exerted by the vacuum brake to be proportionate to the pressure applied at will by the pedal, which purpose will be defeated if, whenever the valve 64 is opened, it could remain open long enough and wide enough to allow the full degree of vacuum existing in the vacuum chamber 55a to be reproduced in the chamber 87 and thereby in the piston cylinder 90, such equalization of pressure is prevented by the construction shown which operates as follows:

The sub-atmospheric pressure admitted, as described, to the chamber 87, is experienced on the inner side of the diaphragm 68 which is exposed at the outer side to atmospheric pressure, which thereupon tends to force the diaphragm inward and close the valve 64; and it will be seen, therefore, that when the valve 64 has been opened by the thrust of the plunger 40, as described, it will be closed as soon as the depression in the chamber 87, and at the inner side of the diaphragm 68, is such as to make the force due to atmospheric pressure over the relatively large area of the diaphragm operative for closing the valve, and on the upper end of the lever 47, for rocking it over its fulcrum 49, exceed the force applied by the plunger 40 at the other end of the lever for opening the valve. It thus results that if slight pressure is applied by the pedal to the plunger 40, the valve 64 will stay open only for a very brief instant, while the depression in the chamber 87 and in the piston cylinder becomes only a small fraction of that in the vacuum chamber 55a, and the piston will therefore apply only a correspondingly small pressure to the wheel brakes. But if the operator depresses the pedal and continues to hold it down with extreme pressure of his foot, he may hold the valve 64 open until the depression in the chamber 87 and in the piston cylinder is nearly or even quite that in the vacuum chamber 55a; and the piston will therefore apply to the wheel brakes the maximum pressure derivable from the vacuum in the chamber 55a.

In this connection it is to be noted that the vacuum trapping device described, tends to produce in the vacuum chamber 55a, not merely the vacuum at any given instant existing in the engine cylinder from which the vacuum is derived, but rather to build up the vacuum in the chamber 55a and maintain it at the maximum or peak vacuum of the cylinder, thus rendering the braking system described exceptionally effective for the widest range of braking action obtainable by the use of engine suction.

When the vacuum brake has been applied to any relatively high degree and the operator desires to relax the pressure, such relaxing of pressure applied by the foot on the pedal operates in the same way as described, with respect to original application of pressure, that is, so that relaxing of the pedal pressure correspondingly relaxes the brake pressure, this result being obtained by the construction as described as comprising the diaphragm 59 connected with the valve 51 for actuating the latter in opening direction by the development of the condition of sub-atmospheric pressure in the chamber 87. For it will be seen upon consideration of the structure, that when a given depression has been produced in the chamber 87, by the opening and closing of the valve 64, as described, since that valve is held closed by the action of the diaphragm 68 overcoming the force applied by the plunger 40 in the direction for opening said valve, that result,—holding the valve closed,—is dependent upon the lever 47, fulcruming at the pivot 49 by reason of the valve 51 being held pressed on its seat; and that if the pressure of the plunger on the lever 47 is relaxed while the valve 64 is held seated, the action of the diaphragm 59 on the valve 51, due to the depression obtained in the chamber 87, will operate to thrust the valve 51 open, causing the lever 47 to fulcrum on its pivotal connection with the valve stem 63, and yield to the left at the end at which it is held only by the plunger 40 which, under the condition of relaxed pedal pressure, will yield and permit the pedal to move to the left and permit the valve 51 to open. But the slighest opening of the valve 51, admitting atmospheric pressure and reducing the degree of vacuum in the chamber 87, will make the force exerted by the plunger again sufficient to close the valve 51; and thus when the pressure in the chamber 87, and thereby the piston cylinder 90, is reduced to correspond to the reduction of pressure exerted on the pedal, it will become static until further reduction in the pedal pressure permits further venting of the vacuum in the chamber 87; and thus the braking pressure applied by the piston in the cylinder will be reduced as the pedal pressure is reduced just as it was originally developed proportionately to the pedal pressure.

In detail it will be obvious that the normal position of the valves is that the fluid pressure controlling valve 64 is closed while the venting valve 51 is open and that there will be a slight differential in pressure tending to maintain the valve 64 closed due to the fact that atmospheric pressure acts against the diaphragm while the reduced pressure acts against the end of the valve but the valve 51 will be balanced by the atmospheric pressure acting thereon. If the operator desires to lightly apply the brakes, a slight pressure on the foot pedal tending to rotate the lever 27 and inwardly move the plunger 40 will produce pressure on the lower end of the lever 47, thereby moving the lever against resistance of spring 67 and initially seating the venting valve 51. After the valve 51 has become seated, the lever 47 will fulcrum about its pivotal connection therewith and produce an opening movement of the valve 64. As the pressure in the chamber 87 becomes reduced, it will be apparent that more and more pressure will be required to hold the valve 64 open and, therefore, if the operator maintains the same pressure on the foot pedal, the pedal will be slightly raised by the closing of valve 64. If further braking is desired, the operator increases the foot pressure to hold the valve 64 in open position until a higher effective differential pressure acts upon the working piston 91. If the operator relaxes the pressure upon the foot pedal, the valve 64 will be immediately closed and the venting valve 51 will be automatically opened after the closure of valve 64 since there will be a differential in pressure tending to produce opening of the valve 51. As the valve 51 is opened, the chamber 87 is vented and the foot pedal pressure will again become sufficient to close the valve 51 and open the valve 64. Thus a variable control of the braking pressure is obtained in both directions of the movement of the foot pedal.

While I have described my invention above in detail I wish it to be understood that many changes may be made therein without departing from the spirit of the same.

I claim:

1. In an apparatus for the purpose indicated, in combination with a source of fluid pressure different from the atmospheric pressure, mechanism adapted to be controlled by said pressure for work-performing movement, means operable at will and connections therefrom for controlling the communication of said fluid pressure with said mechanism intermittently, said connections comprising means for intermittently applying and relieving said pressure and applying from said connections a greater force closing the pressure relief than the force opening the communication, the same being adapted to vary the application of said pressure in both increasing and decreasing amounts according to the increasing and decreasing amounts of force applied to said connections.

2. In an apparatus for the purpose indicated, in combination with a source of fluid pressure different from the atmospheric pressure, mechanism adapted to be controlled by said pressure for work-performing movement, a reservoir for maintaining said fluid pressure in reserve, said reservoir having continuous restricted communication with said source, means operable by pressure variable at will for putting said mechanism in communication with said fluid pressure reservoir, the operating connections from said means being adapted to effect communication intermittently according to the variation of the pressure applied at will, said connections comprising means for intermittently applying and relieving said pressure and applying from said connections a greater force closing the pressure relief than the force opening the communication, the same being adapted to vary the application of said pressure in both increasing and decreasing amounts according to the increasing and decreasing amounts of force applied to said connections.

3. In a construction for purposes of the character indicated, a source of vacuum, a piston chamber and a piston reciprocable therein, means for controlling communication of the piston chamber with the source of vacuum comprising a chambered casing having its chamber in communication with the vacuum source and having a valve controlling said communication, said chamber having a vacuum vent port and a valve controlling said port, flexible diaphragms forming part of the wall of the chamber and connected to said valves respectively for controlling their seating and unseating, lever means for operating said valves by the same movement for closing the vent and opening the vacuum-controlling valve, and means operable for actuating said lever variably at will.

4. In the construction defined in claim 3, a casing comprising integrally the vacuum reservoir and the piston cylinder, and housings for the diaphragm walled chambers and valves.

5. In the construction defined in claim 3, the vacuum inlet and vent valves each having its stem and guide bearing at the vacuum side of the diaphragm, whereby leakage around the stem at the bearing is avoided.

6. Apparatus for doing work by fluid pressure comprising a source of fluid pressure different from the atmosphere, work-performing means adapted to be controlled by the differential in pressure between the atmosphere and said fluid pressure, a normally closed valve for controlling the communication of said fluid pressure with said work-performing means, a normally open valve for venting the communication between said normally closed valve and said work-performing means, means associated with each valve exposed on one side to atmospheric pressure and on the other side to the fluid pressure different from the atmosphere acting on said work-performing means and arranged to move the valve by the differential in pressure towards the normal position thereof and means for variably conveying pressure to operate said valves.

7. Apparatus for doing work by fluid pressure comprising a source of pressure different from the atmosphere, work-performing means adapted to be moved by the differential in pressure between the atmosphere and said fluid pressure, a normally closed valve for controlling the communication of said fluid pressure with said work-performing means, a normally open valve for venting the communication between said normally closed valve and said work-performing means, a diaphragm attached to each valve exposed on one side to atmospheric pressure and on the other side to the fluid pressure different from the atmosphere acting against said work-performing means and arranged to move the valve by the differential in pressure towards the normal position thereof and means for variably conveying pressure to operate said valves.

8. In combination with an internal combustion engine, means adapted to be operated by the differential between the atmospheric pressure and vacuum pressure, a vacuum reservoir for trapping the vacuum pressure, a connection from said reservoir to the intake manifold of the engine, a normally closed check valve in said connection adapted to be opened to exhaust air from the reservoir during suction conditions in the intake manifold, a normally open check valve in said connection on the manifold side of said first-mentioned check valve adapted to be seated during conditions of high suction in the intake manifold and means permitting a restricted flow through said connection when said second-mentioned check valve is seated.

9. In combination with an internal combustion engine, a vacuum trapping reservoir, work performing means adapted to be actuated by the differential in pressure between the atmospheric pressure and vacuum derived from said reservoir, a communication between said reservoir and the intake manifold of the engine, a pair of spring-pressed check valves in said communication, one of said check valves being arranged adjacent to said intake manifold and adapted to be held normally open by the force of its spring, the second of said check valves being between said reservoir and the other check valve and arranged to be normally seated by the force of its spring, whereby said first-mentioned check valve is seated against the force of its spring during conditions of high suction in the intake manifold and means permitting a restricted flow past said first-mentioned check valve while it is seated.

10. In an apparatus as described in claim 6, the means for variably applying pressure to control said valves including a lever pivotally connected at one end to one of said valves and intermediately fulcrumed to the other of said valves, resilient means normally assisting in holding said lever in released position and selectively operable means for applying pressure to the other end of said lever.

11. In an apparatus as described in claim 7, the means for variably applying pressure to operate said valves including a lever pivotally connected at one end to one of said valves and intermediately fulcrumed to the other of said valves, resilient means normally assisting in holding said lever in released position and selectively operable means for applying pressure to the other end of said lever.

12. Apparatus for doing work by fluid pressure comprising a source of pressure different from the atmosphere, work-performing means adapted to be moved by the differential in pressure between the atmosphere and said fluid pressure, a valve casing having a chamber therein forming a communication between said source of fluid pressure and said work-performing means, a normally closed valve guided for movement by said valve casing and adapted to control the admission of said fluid pressure to said chamber, a normally open valve guided for movement by said valve casing and controlling the venting of said chamber, a flexible diaphragm attached to each valve and secured in sealing relation to said valve casing, each of said diaphragms being exposed on the exterior to atmospheric pressure and on the interior to the fluid pressure different from the atmosphere which acts against the work-performing means whereby the differential in presture tends to move each of the valves to normal position and means for variably applying pressure to operate said valves.

13. In a device of the character described, the combination of a source of pressure differing from the atmospheric pressure, an automotive vehicle accessory means adapted to be controlled by said source of pressure, an inlet valve adapted to communicate said pressure with said means, a relief valve relatively movable as to the inlet valve and having a positive connection to the inlet valve, which connection to each valve is unyielding relative to the latter in the direction of movement of each of the valves adapted to relieve the pressure thus communicated with said means, manual means for operating said valves, having a positive manual operating connection leading to one of said valves, said manually operated means cooperating with the elements herein specified adapted to maintain an increased difference of the pressure from the atmospheric pressure according to the degree of pressure of the manual operating means.

14. In a device of the character described, the combination of a source of vacuum, an automotive vehicle accessory means adapted to be controlled by said source of vacuum, an inlet valve adapted to communicate said vacuum with said means, a relief valve relatively movable as to the inlet valve and having a positive connection to the inlet valve, which connection to each valve is unyielding relative to the latter in the direction of movement of each of the valves adapted to relieve the vacuum thus communicated with said means, manual means for operating said valves, having a positive manual operating connection leading to one of said valves, said manually operated means cooperating with the elements herein specified adapted to maintain an increased vacuum according to the degree of pressure of the manual operating means.

15. In a device of the character described, the combination of a source of pressure differing from the atmospheric pressure, an automotive vehicle accessory means adapted to be controlled by said source of pressure, an inlet valve adapted to communicate said pressure with said means, a relief valve relatively movable as to the inlet valve and having a positive connection to the inlet valve, which connection to each valve is unyielding relative to the latter in the direction of movement of each of the valves adapted to relieve the pressure thus communicated with said means, manual means for operating said valves, having a positive manual operating connection leading to one of said valves, said manual operating means cooperating with the elements herein specified adapted to maintain an increased difference of the pressure from the atmospheric pressure according to the degree of pressure of the manually operated means, the relief valve being adapted to close initially to permit the opening of the inlet valve and to open when permitted by the closing of the inlet valve for the release of said pressure.

16. In a device of the character described, the combination of a source of vacuum, an automotive vehicle accessory means adapted to be controlled by said source of vacuum, an inlet valve adapted to communicate said vacuum with said means, a relief valve relatively movable as to the inlet valve and having a positive connection to the inlet valve, which connection to each valve is unyielding relative to the latter in the direction of movement of each of the valves adapted to relieve the vacuum thus communicated with said means, manual means for operating said valves, having a positive manual operating connection leading to one of said valves, said manual operating means cooperating with the elements herein specified adapted to maintain an increased vacuum according to the degree of pressure of the manually operated means, the relief valve being adapted to close initially to permit the opening of the inlet valve and to open when permitted by the closing of the inlet valve for the release of said vacuum.

17. In a device of the character described, the combination of a source of pressure differing from the atmospheric pressure, an automotive vehicle accessory means adapted to be controlled by said source of pressure, an inlet valve adapted to communicate said pressure with said means, a relief valve relatively movable as to the inlet valve and having a positive connection to the inlet valve, which connection to each valve is unyielding relative to the latter in the direction of movement of each of the valves adapted to relieve the pressure thus communicated with said means, manual means for operating said valves, having a positive manual operating connection leading to both of said valves, said manually operated means cooperating with the elements herein specified adapted to maintain an increased difference of the pressure from the atmospheric pressure according to the degree of pressure of the manual operating means.

18. In a device of the character described, the combination of a source of vacuum, an automotive vehicle accessory means adapted to be controlled by said source of vacuum, an inlet valve adapted to communicate said vacuum with said means, a relief valve relatively movable as to the inlet valve and having a positive connection to the inlet valve, which connection to each valve is unyielding relative to the latter in the direction of movement of each of the valves adapted to relieve the vacuum thus communicated with said means, manual means for operating said valves, having a positive manual operating connection leading to both of said valves, said manually operated means cooperating with the elements herein specified adapted to maintain an increased vacuum according to the degree of pressure of the manual operating means.

19. In a device of the character described, the combination of a source of pressure differing from the atmospheric pressure, an automotive vehicle accessory means adapted to be controlled by said source of pressure, an inlet valve adapted to communicate said pressure with said means, a relief valve relatively movable as to the inlet valve and having a positive connection to the inlet valve, which connection to each valve is unyielding relative to the latter in the direction of movement of each of the valves adapted to relieve the pressure thus communicated with said means, manual means for operating said valves, having a positive manual operating connection leading to both of said valves, said manual operating means cooperating with the elements herein specified adapted to maintain an increased difference of the pressure from the atmospheric pressure according to the degree of pressure of the manually operated means, the relief valve being adapted to close initially to permit the opening of the inlet valve and to open when permitted by the closing of the inlet valve for the release of said pressure.

20. In a device of the character described, the combination of a source of vacuum, an automotive vehicle accessory means adapted to be controlled by said source of vacuum, an inlet valve adapted to communicate said vacuum with said means, a relief valve relatively movable as to the inlet valve and having a positive connection to the inlet valve, which connection to each valve is unyielding relative to the latter in the direction of movement of each of the valves adapted to relieve the vacuum thus communicated with said means, manual means for operating said valves, having a positive manual operating connection leading to both of said valves, said manually operated means cooperating with the elements herein specified adapted to maintain an increased vacuum according to the degree of pressure of the manual operating means, the relief valve being adapted to close initially to permit the opening of the inlet valve and to open when permitted by the closing of the inlet valve for the release of said vacuum.

21. In a device of the character described, the combination of a source of pressure differing from the atmospheric pressure, an automotive vehicle accessory means adapted to be controlled by said source of pressure, an inlet valve adapted to communicate said pressure with said means, a relief valve relatively movable as to the inlet valve and having a positive connection to the inlet valve, which connection to each valve is unyielding relative to the latter in the direction of movement of each of the valves adapted to relieve the pressure thus communicated with said means, manual means adapted to be moved independently of the movement of said first-mentioned means for operating said valves, having a positive manual operating connection leading to one of said valves, said manually operated means cooperating with the elements herein specified adapted to maintain an increased difference of the pressure from the atmospheric pressure according to the degree of pressure of the manual operating means.

22. In a device of the character described, the combination of a source of vacuum, an automotive vehicle accessory means adapted to be controlled by said source of vacuum, an inlet valve adapted to communicate said vacuum with said means, a relief valve relatively movable as to the inlet valve and having a positive connection to the inlet valve, which connection to each valve is unyielding relative to the latter in the direction of movement of each of the valves adapted to relieve the vacuum thus communicated with said means, manual means adapted to be moved independently of the movement of said first-mentioned means for operating said valves, having a positive manual operating connection leading to one of said valves, said manually operated means cooperating with the elements herein specified adapted to maintain an increased vacuum according to the degree of pressure of the manual operating means.

23. In a device of the character described, the combination of a source of pressure differing from the atmospheric pressure, an automotive vehicle accessory means adapted to be controlled by said source of pressure, an inlet valve adapted to communicate said pressure with said means, a relief valve relatively movable as to the inlet valve and having a positive connection to the inlet valve, which connection to each valve is unyielding relative to the latter in the direction of movement of each of the valves adapted to relieve the pressure thus communicated with said means, manual means adapted to be moved independently of the movement of said first-mentioned means for operating said valves, having a positive manual operating connection leading to one of said valves, said manually operated means cooperating with the elements herein specified adapted to maintain an increased difference of the pressure from the atmospheric pressure according to the degree of pressure of the manual operating means, the relief valve being adapted to close initially to permit the opening of the inlet valve and to open when permitted by the closing of the inlet valve for the release of said pressure.

24. In a device of the character described, the combination of a source of vacuum, an automotive vehicle accessory means adapted to be controlled by said source of vacuum, an inlet valve adapted to communicate said vacuum with said means, a relief valve relatively movable as to the inlet valve and having a positive connection to the inlet valve, which connection to each valve is unyielding relative to the latter in the direction of movement of each of the valves adapted to relieve the vacuum thus communicated with said means, manual means adapted to be moved independently of the movement of said first-mentioned means for operating said valves, having a positive manual operating connection leading to one of said valves, said manually operated means cooperating with the elements herein specified adapted to maintain an increased vacuum according to the degree of pressure of the manual operating means, the relief valve being adapted to close initially to permit the opening of the inlet valve and to open when permitted by the closing of the inlet valve for the release of said vacuum.

25. In a device of the character described, the combination of a source of pressure differing from the atmospheric pressure, an automotive vehicle accessory means adapted to be controlled by said source of pressure, an inlet valve adapted to communicate said pressure with said means, a relief valve relatively movable as to the inlet valve and having a positive connection to the inlet valve, which connection to each valve is unyielding relative to the latter in the direction of movement of each of the valves adapted to relieve the pressure thus communicated with said means, manual means adapted to be moved independently of the movement of said first-mentioned means for operating said valves, having a positive manual operating connection leading to both of said valves, said manually operated means cooperating with the elements herein specified adapted to maintain an increased difference of the pressure from the atmospheric pressure according to the degree of pressure of the manual operating means.

26. In a device of the character described, the combination of a source of vacuum, an automotive vehicle accessory means adapted to be controlled by said source of vacuum, an inlet valve adapted to communicate said vacuum with said means, a relief valve relatively movable as to the inlet valve and having a positive connection to the inlet valve, which connection to each valve is unyielding relative to the latter in the direction of movement of each of the valves adapted to relieve the vacuum thus communicated with said means, manual means adapted to be moved independently of the movement of said first-mentioned means for operating said valves, having a positive manual operating connection leading to both of said valves, said manually operated means cooperating with the elements herein specified adapted to maintain an increased vacuum according to the degree of pressure of the manual operating means.

27. In a device of the character described, the combination of a source of pressure differing from the atmospheric pressure, an automotive vehicle accessory means adapted to be controlled by said source of pressure, an inlet valve adapted to communicate said pressure with said means, a relief valve relatively movable as to the inlet valve and having a positive connection to the inlet valve, which connection to each valve is unyielding relative to the latter in the direction of movement of each of the valves adapted to relieve the pressure thus communicated with said means, manual means adapted to be moved independently of the movement of said first-mentioned means for operating said valves, having a positive manual operating connection leading to both of said valves, said manual operating means cooperating with the elements herein specified adapted to maintain an increased difference of the pressure from the atmospheric pressure according to the degree of pressure of the manually operated means, the relief valve being adapted to close initially to permit the opening of the inlet valve and to open when permitted by the closing of the inlet valve for the release of said pressure.

28. In a device of the character described, the combination of a source of vacuum, an automotive vehicle accessory means adapted to be controlled by said source of vacuum, an inlet valve adapted to communicate said vacuum with said means, a relief valve relatively movable as to the inlet valve and having a positive connection to the inlet valve, which connection to each valve is unyielding relative to the latter in the direction of movement of each of the valves adapted to relieve the vacuum thus communicated with said means, manual means adapted to be moved independently of the movement of said first-mentioned means for operating said valves, having a positive manual operating connection leading to both of said valves, said manual operating means cooperating with the elements herein specified adapted to maintain an increased vacuum according to the degree of pressure of the manually operated means, the relief valve being adapted to close initially to permit the opening of the inlet valve and to open when permitted by the closing of the inlet valve for the release of said vacuum.

29. In a device of the character described, the combination of a source of pressure differing from the atmospheric pressure, an automotive vehicle accessory means adapted to be controlled by said source of pressure, an inlet valve carrying a pressure responsive area adapted to communicate said pressure to said means, a relief valve carrying another pressure responsive area adapted to relieve the pressure thus communicated to said means, manually operated means for operating said valves having a positive connection leading to one of said valves, said pressure, when applied to the accessory means, being adapted to exert from one of said valves a force in opposition to the movement of the manual means.

30. In a device of the character described, the combination of a source of vacuum, an automotive vehicle accessory means adapted to be controlled by said source of vacuum, an inlet valve carrying a pressure responsive area adapted to communicate said vacuum to said means, a relief valve carrying another pressure responsive area adapted to relieve the vacuum thus communicated to said means, manually operated means for operating said valves having a positive connection leading to one of said valves, said vacuum, when applied to the accessory means, being adapted to exert from one of said valves a force in opposition to the movement of the manual means.

31. In a device of the character described, the combination of a source of pressure differing from the atmospheric pressure, an automotive vehicle accessory means adapted to be controlled by said source of pressure, an inlet valve carrying a pressure responsive area in open position, adapted to communicate said pressure to said means, a relief valve carrying another pressure responsive area tending to open it, adapted to relieve the pressure thus communicated to said means, manually operated means for operating said valves comprising a lever connecting said valves together to enable each of said valves to alternately operate as a fulcrum for the other valve.

32. In a device of the character described, the combination of a source of vacuum, an automotive vehicle accessory means adapted to be controlled by said source of vacuum, an inlet valve carrying a pressure responsive area in open position, adapted to communicate said vacuum to said means, a relief valve carrying another pressure responsive area tending to open it, adapted to relieve the vacuum thus communicated to said means, manually operated means for operating said valves comprising a lever connecting said valves together to enable each of said valves to alternately operate as a fulcrum for the other valve.

33. In a device for work performing movement, the combination of pressure differing from the atmospheric pressure, an accumulator reservoir adapted to maintain a substantially uniform level of said pressure, means including a check valve for maintaining said pressure, a normally shut inlet valve for supplying said pressure from the reservoir for work performing actuation, a relief valve for relieving pressure so supplied, and a positive manual operating connection to one of the valves adapted to operate the inlet and relief valves by an amount of manual pressure coordinated to the pressure that has been supplied for work performing movement, said valves being relatively movable but having the said positive connection between them unyielding in the direction of the valve movement.

34. In a device for work performing movement, the combination of means, including inlet and outlet valves, for producing said movement, adapted to apply an increasing pressure according to the desired increase of the work performance, and a positive manual operating connection adapted to control said inlet and outlet valves, which are relatively movable and positively connected together so as to be relatively unyielding between each of said valves and the connection in the direction of movement of each of the valves, by applying an amount of increasing manual pressure thereto coordinated to the different individual increased pressures conveyed by said means.

35. In a device for work performing movement, the combination of a housing having therein means, including inlet and outlet valves, for controlling the admission and exit of a pressure differing from the atmospheric pressure, a chamber for receiving said pressure before passing the inlet valve, and a work performing cylinder and piston, adapted to be controlled by said pressure, for producing said movement, adapted to apply an increasing pressure according to the desired increase of the work performance and a manual operating device adapted to control said means by applying an amount of increasing manual pressure thereto coordinated to the different individual increased pressures conveyed by said means, a wall of said housing constituting a wall of said cylinder and of said chamber.

36. In an apparatus for the purpose indicated, in combination with a source of fluid pressure different from the atmospheric pressure, a housing having therein, mechanism adapted to be controlled by said pressure for work-performing movement, means operable at will and connections therefrom for controlling the communication of said fluid pressure with said mechanism intermittently, said connections comprising means for intermittently applying and relieving said pressure and applying from said connection a greater influence to close the pressure relief than the influence to open the communication, the same being adapted to vary the application of said pressure in both increasing and decreasing amounts according to the increasing and decreasing amounts of force applied to said connections.

EDWARD A. ROCKWELL.